(12) United States Patent
Millar et al.

(10) Patent No.: US 7,385,590 B2
(45) Date of Patent: Jun. 10, 2008

(54) SURVEILLANCE SYSTEM WORKSTATION

(75) Inventors: Greg Max Millar, Coarsegold, CA (US); Jim George, Fresno, CA (US)

(73) Assignee: Pelco, Inc., Clovis, CA (US)

( * ) Notice: Subject to any disclaimer, the term of this patent is extended or adjusted under 35 U.S.C. 154(b) by 659 days.

(21) Appl. No.: 10/853,010

(22) Filed: May 25, 2004

(65) Prior Publication Data

US 2005/0275631 A1     Dec. 15, 2005

(51) Int. Cl.
G09G 5/00 (2006.01)
G06F 3/048 (2006.01)
H04N 7/18 (2006.01)

(52) U.S. Cl. .................. 345/170; 345/169; 345/172; 715/817; 715/819; 715/831; 715/840; 715/841; 348/143; 348/151; 348/152; 348/156

(58) Field of Classification Search ......... 345/168–170, 345/172; 341/22, 23, 174–176; 340/426.18, 340/506; 725/37, 38, 108, 133; 348/152, 348/153, 207.11; 715/840, 841, 969
See application file for complete search history.

(56) References Cited

U.S. PATENT DOCUMENTS

| | | | |
|---|---|---|---|
| 6,310,609 B1 * | 10/2001 | Morgenthaler | 345/170 |
| 6,583,813 B1 | 6/2003 | Enright et al. | |
| 6,906,701 B1 * | 6/2005 | Oueslati et al. | 345/170 |
| 6,917,373 B2 * | 7/2005 | Vong et al. | 715/840 |
| 7,154,428 B2 * | 12/2006 | de Clercq et al. | 341/175 |
| 2003/0174154 A1 | 9/2003 | Yukie et al. | |
| 2003/0208692 A9 | 11/2003 | Kimmel et al. | |
| 2005/0062636 A1 * | 3/2005 | Conway et al. | 341/176 |

* cited by examiner

Primary Examiner—Henry N Tran
(74) Attorney, Agent, or Firm—Paul T. Kashimba, Esq.

(57) ABSTRACT

A workstation for a surveillance system comprising a display, a user input device and a control unit in communication with the display and the user input device. The user input device has a plurality of keys and a light source to light the keys with a plurality of different colors. The control unit generates an image on the display that has a plurality of differently colored icons with each of the icons symbolizing a function to be performed by the control unit. The control unit generates a control signal to the user input device causing the light source to light the plurality of keys in the user input device in colors to correspond to the colors of the icons in the image on the display. The control unit performs the control function corresponding to a particular icon from the plurality of differently colored icons when a user activates a key from the plurality keys having the color that corresponds to the color of the particular icon.

10 Claims, 3 Drawing Sheets

SURVEILLANCE SYSTEM WORKSTATION

CROSS-REFERENCE TO RELATED APPLICATION

N/A

STATEMENT REGARDING FEDERALLY SPONSORED RESEARCH OR DEVELOPMENT

N/A

BACKGROUND OF THE INVENTION

This invention relates to surveillance systems and, in particular, to a workstation for use with a surveillance system. As used herein surveillance system includes building management and security systems.

Prior art surveillance system workstations have been difficult to use requiring the user to memorize various function keys on the keyboard of the controller to operate certain desired functions. Moreover, these keys have a specific function that does not change as the user interface on the display changes, thus the possibility of additional functions cannot be performed. In addition, prior art systems have not provided a way for the user to correlate an action that should be taken at the user input device in relation to the user interface displayed on the monitor. Accordingly, there has been a need for an improved workstation for use in surveillance systems that provides the user with greater ease of use.

SUMMARY OF THE INVENTION

In accordance with the present invention there is provided a workstation for a surveillance system comprising a display, a user input device and a control unit in communication with the display and the user input device. The user input device has a plurality of keys and a light source to light the keys with a plurality of different colors. The control unit generates an image on the display that has a plurality of differently colored icons with each of the icons symbolizing a function to be performed by the control unit. The control unit generates a control signal to the user input device causing the light source to light the plurality of keys in the user input device in colors to correspond to the colors of the icons in the image on the display. The control unit performs the control function corresponding to a particular icon from the plurality of differently colored icons when a user activates a key from the plurality keys having the color that corresponds to the color of the particular icon.

In accordance with the present invention there is also provided a workstation for a surveillance system comprising a display, a user input device and a control unit in communication with the display and the user input device. The user input device has a plurality of keys and a light source to light the keys. The control unit generates an image on the display that has a plurality of different icons with each of the icons symbolizing a function to be performed by the control unit. The control unit generates a control signal when an alarm condition has occurred to cause the icon indicating the alarm condition on the screen to blink and generates a signal to cause the light source in the user input device to blink the light in the key that requires user input to release the alarm condition.

Other advantages and applications of the present invention will be made apparent by the following detailed description of the preferred embodiment of the invention.

BRIEF DESCRIPTION OF THE SEVERAL VIEWS OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
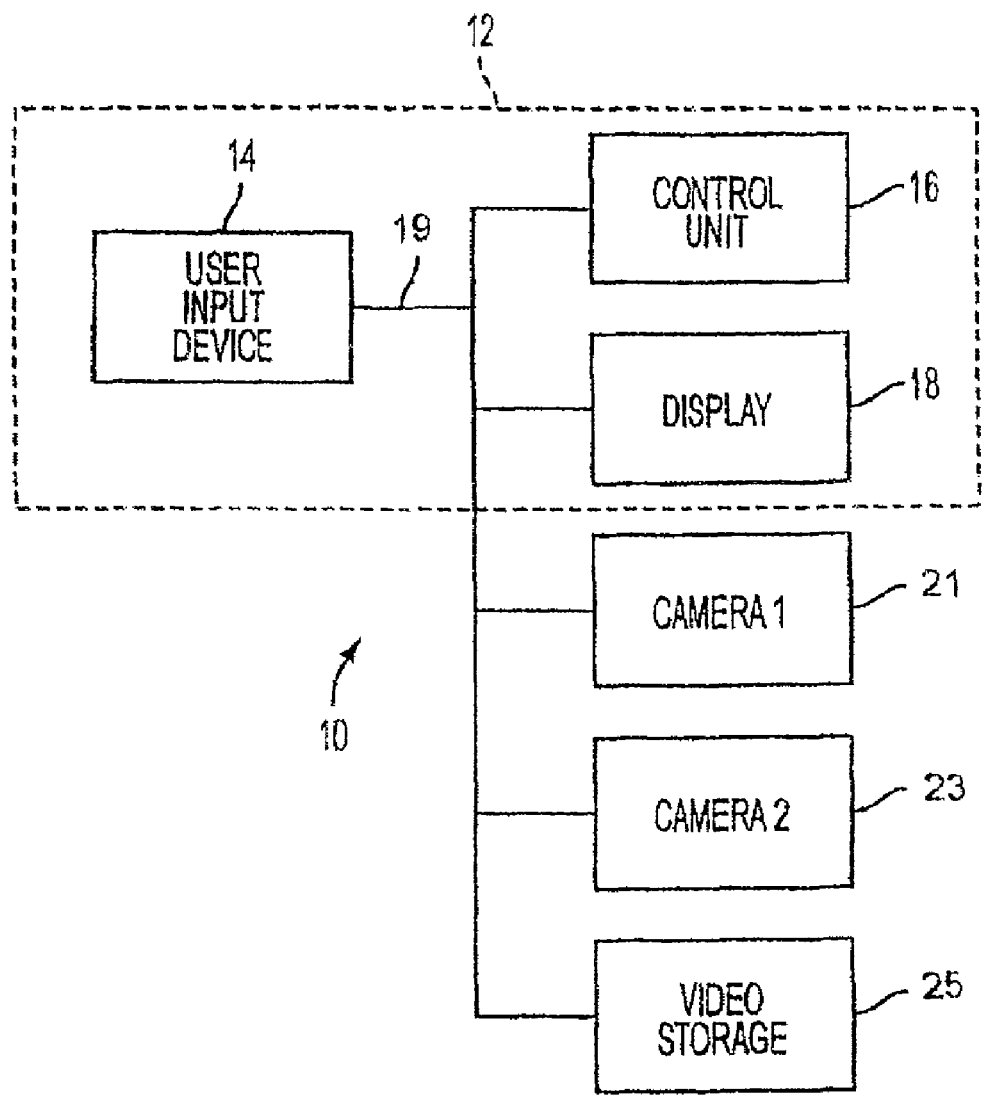
FIG. 1 is a block diagram of the workstation according to the present invention.

Referring to FIG. 1, a surveillance system 10 is shown incorporating the user workstation 12 of the present invention. User work station 12 includes user input device 14, connected to control unit 16 and display 18 by network 19, which can be a hard-wired closed network, local area network, or wide area network such as the Internet. User input device 14 and display 18 are located proximate so that the user can view the images on display 18 while operation user input device 14. However, control unit 16, which includes a microprocessor, memory and program instructions can be located anywhere in surveillance system 10. The input from user device 14 in combination with control unit 16 control operation of cameras 21 and 23 and video storage 25 as is known in the art.

Figure 2:
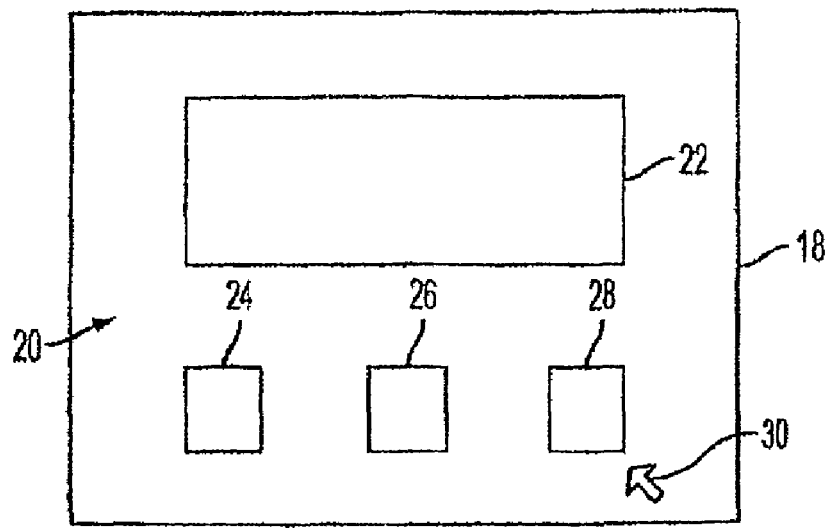
FIG. 2 is a block diagram of a screen display of the workstation according to the present invention.

In FIG. 2, display 18 is shown with an image 20 that contains video data 22 and icons 24, 26, and 28, which can be rectangles or any specialize icons. Icons 24, 26, and 28 are displayed in image 20 by control unit 16 with different colors to symbolize different functions that can be performed, for example, select camera. Image 20 can also have a pointer 30 which can be moved by a joystick, mouse or keypad to select and activate icons 24, 26, and 28.

Figure 3:
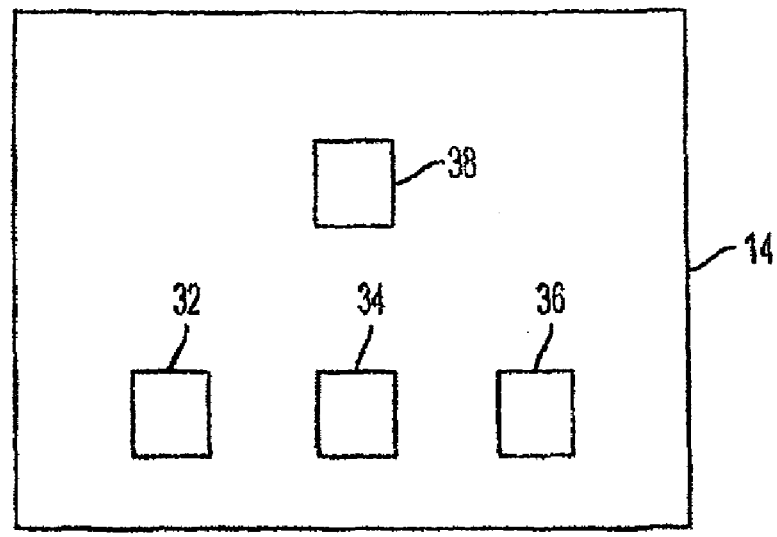
FIG. 3 is a block diagram of the user input device of the workstation according to the present invention.
Figure 4:
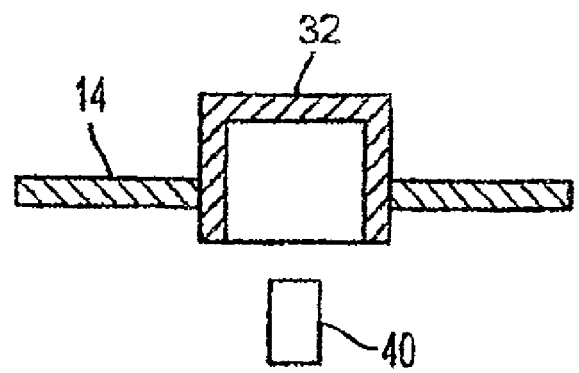
FIG. 4 is a partial cross-sectional schematic block diagram of the user input device show in FIG. 3.

User input device 14 is shown in further detail in FIGS. 3 and 4. User input device 14 has keys 32, 34, and 36, which are made of clear acrylic or other suitable material. A light source 40, such as a light emitting diode containing red, green and blue light emitting diodes, is positioned below each of keys 32, 34, and 36 so that control unit 16 can provide control signals to user input device 14 to light the appropriate key with the appropriate color so that the colors of keys 32, 34, and 36 correspond to the colors of icons 24, 26, and 28 respectively. FIG. 4 shows schematically how light source 40 is positioned below key 32 so that when light source 40 is activated by a control signal from control unit 16 the appropriate light emitting diode or diodes are activated so that key 32 is the appropriate color to correspond to the color of icon 24. The colors of key 32, 34, and 36 can be in the same color order as icons 24, 26, and 28 as discussed above or they may be in a different order. User input device 14 can also have a joystick 38 for performing various control functions as is known in the art.

Figure 5:
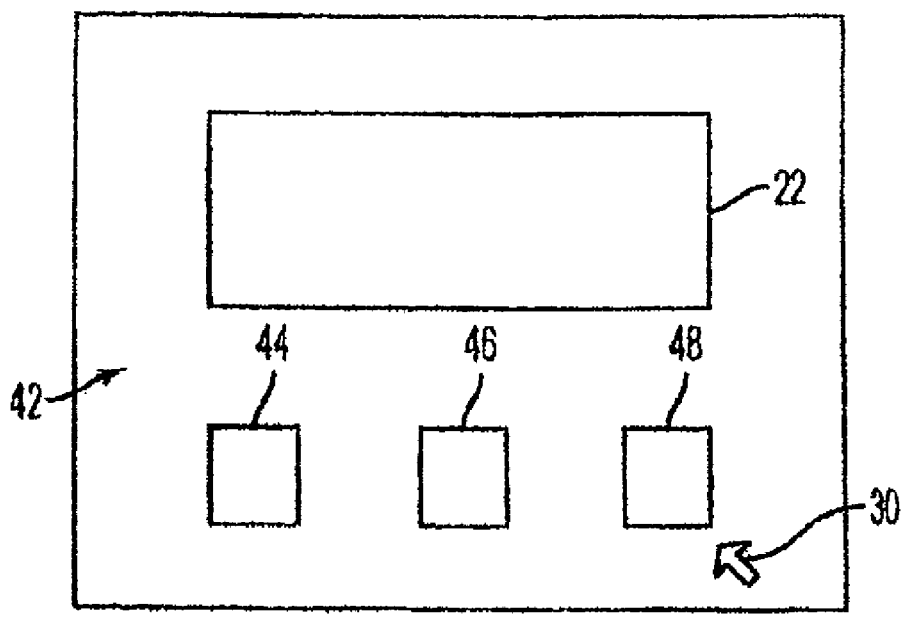
FIG. 5 is a block diagram of a screen display of the workstation according to the present invention.

When one of keys 32, 34, and 36 is actuated, the corresponding function indicated by icons 24, 26, and 28 is performed which may create a new image 42 on display 18 as shown in FIG. 5. Image 42 may still contain video data 22; however, new icons 44, 46, and 48 may now be displayed to offer new functions to the user. In FIG. 5 three new icons have been shown; however, it is not necessary that all of the icons change since control unit 16 provides a control signal to provide the appropriate image to be displayed based on the function invoked by the key depressed.

Control unit 16 generates a control signal when an alarm condition has occurred to cause the icon indicating the alarm condition on the screen to blink. In addition, control unit 16 also generates a signal to cause light source 40 to blink in the appropriate key that corresponds to the key that the user must depress to release the alarm condition. Accordingly, the appropriate key on user input device 14 is readily identified by the user since it is blinking. In addition, control unit 16 can light the blinking key in a color that corresponds to the color of the blinking icon on the screen.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A workstation for a surveillance system comprising a display, a user input device and a control unit in communication with said display and said user input device, said user input device having a plurality of keys and a light source to light said keys with a plurality of different colors, said control unit generating an image on said display that has a plurality of differently colored icons with each of said icons symbolizing a function to be performed by said control unit, said control unit generating a control signal to said user input device causing said light source to light said plurality of keys in said user input device in colors corresponding to the colors of said icons in said image on said display, and said control unit performing the control function corresponding to a particular icon from said plurality of differently colored icons when a user activates a key from said plurality of keys having the color that corresponds to the color of the particular icon, wherein in response to a user activating one of said plurality of lighted keys on said user input device, said control unit generates a second image on said display that has a plurality of differently colored icons with at least some of said icons symbolizing a different function to be performed by said control unit than in the previous image displayed on said display.

2. A workstation as recited in claim 1, wherein said control unit generates a control signal to said user input device causing said light source to light said plurality of keys in said user input device in the same color order as the colors of said icons in said image on said display.

3. A workstation as recited in claim 1, wherein said light source comprises a light emitting diode.

4. A workstation as recited in claim 3, wherein said light emitting diode comprises red, blue and green light emitting diodes.

5. A workstation for a surveillance system comprising a display, a user input device and a control unit in communication with said display and said user input device, said user input device having a plurality of keys and a light source to light said keys with a plurality of different colors, said control unit generating an image on said display that has a plurality of differently colored icons with each of said icons symbolizing a function to be performed by said control unit, said control unit generating a control signal to said user input device causing said light source to light said plurality of keys in said user input device in colors corresponding to the colors of said icons in said image on said display, and said control unit performing the control function corresponding to a particular icon from said plurality of differently colored icons when a user activates a key from said plurality of keys having the color that corresponds to the color of the particular icon, wherein in response to a user activating one of said plurality of colored icons in said image on said display, said control unit generates a second image on said display that has a plurality of differently colored icons with at least some of said icons symbolizing a different function to be performed by said control unit than in the previous image displayed on said display.

6. A workstation as recited in claim 5, wherein said light source comprises a light emitting diode.

7. A workstation as recited in claim 6, wherein said light emitting diode comprises red, blue and green light emitting diodes.

8. A workstation as recited in claim 5, wherein said control unit generates a control signal to said user input device causing said light source to light said plurality of keys in said user input device in the same color order as the colors of said icons in said image on said display.

9. A workstation for a surveillance system comprising a display, a user input device and a control unit in communication with said display and said user input device, said user input device having a plurality of keys and a light source to light said keys, said control unit generating an image on said display that has a plurality of different icons with each of said icons symbolizing a function to be performed by said control unit, and said control unit generating a control signal when an alarm condition has occurred to cause the icon indicating the alarm condition on the screen to blink and generating a signal to cause said light source in said user input device to blink the light in the key that requires user input to release the alarm condition.

10. A workstation as recited in claim 9, wherein control unit generates a control signal to display said icons with different colors on said display, and wherein said control unit generates a control signal to cause said light source to light the key that corresponds to the blinking icon in a color that corresponds to the color of the blinking icon.

* * * * *